UNITED STATES PATENT OFFICE.

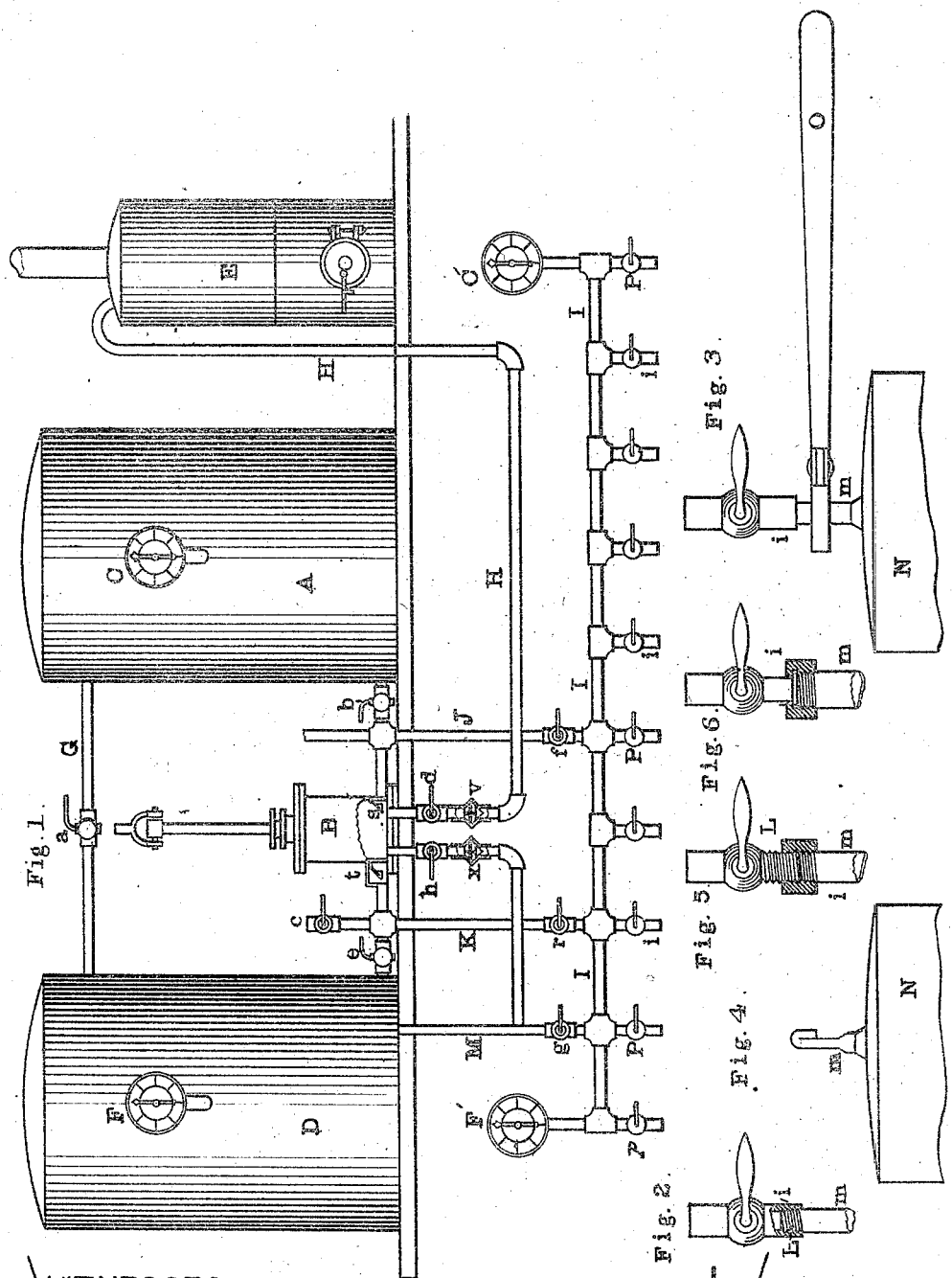

LOUIS McMURRAY, OF BALTIMORE, MARYLAND, ASSIGNOR OF THREE-FIFTHS TO EDGAR MALIN, ARTHUR W. LAWTON, AND LOUIS S. HOUGHTON, ALL OF SAME PLACE.

APPARATUS FOR PRESERVING FRUITS.

SPECIFICATION forming part of Letters Patent No. 334,967, dated January 26, 1886.

Application filed July 9, 1884. Serial No. 137,273. (No model.)

*To all whom it may concern:*

Be it known that I, LOUIS MCMURRAY, of the city of Baltimore and State of Maryland, have invented a new and useful Improvement in Apparatuses for Keeping, Preserving, and Preparing Fruits and Vegetables for Transportation, of which the following is a clear description, illustrated by the accompanying drawings, of which—

Figure 1 shows an upright view of the apparatus, showing the gas-tank and vacuum-tank and a single pump by which the vacuum is induced and the gas forced to the transporting-vessels. Fig. 2 is a sectional view of the tube or pipe $i$, to which the transporting-vessel is attached, showing the thread within the tube, and the soft-metal pipe communicating with the transporting-vessel screwed into the tube. Fig. 3 is a view of the transporting-vessel when packed and filled with preserving-gas under pressure, with the nippers attached for flattening the soft-metal pipe. Fig. 4 is a view of one of the transporting vessels packed and filled, with the soft-metal tube doubled and turned over and ready for transportation. Figs. 5 and 6 show different forms of the tube $i$, illustrating the mode by which the soft-metal tubes are attached thereto.

The object of my invention is to furnish a simple, practical, and rapid method of preparing fruit, vegetables, and other articles of food for transportation, so that they may be surrounded by a preserving-gas under high pressure practically without admixture of air therewith, and kept therein while being transported from place to place.

The general principle by which such articles of food are kept in sound condition by forcing gas into the vessels to expel the air and subjecting them to contact with a preserving-gas under high pressure is made the subject of a pending application filed June 20, 1884.

By the present application I have made substantial improvements by which I exhaust all the air from the vessels without wasting the gas, and subject the article of food to contact with the gas under high-pressure, avoid practically any admixture of air therewith, and make a complete and simple apparatus more effective in its results, while reducing the cost of preparing the article of food to a minimum. My invention is explained as follows:

A represents a tightly-closed vacuum tank or receiver, from which the air is exhausted by the pump B. This tank is provided with the vacuum-gage C.

D is another tank or receiver for holding gas under a high-pressure induced by the pump B. The two tanks A and D are connected together by the pipe G, and this pipe is provided with the cock $a$.

E is a gas-generator, connected to the pump B by means of the pipe H, which pipe is provided with the valve $v$ and the cock $a$. The gas-pressure tank D is provided with the pressure-gage F, for ascertaining the pressure of gas in the tank, which is intended to be higher than required for preserving the food articles in order to supply the gas at sufficient pressure to the transporting-vessels. The pump B is connected at its lower end to the two tanks A and D by suitable pipes. The one leading to the vacuum-tank A is provided with the cock $b$, and that leading to the pressure-tank D is provided with the cock $e$, between the pump B and the gas-pressure tank D. The connecting-pipe is tapped by a short upright pipe provided with the cock $c$. At the junctions of the two connecting-pipes with the pump I have placed the valves $s$ and $t$.

I is a pipe provided with the gages C' and F. The pipe J joins the pipe I to the connecting-pipe between the pump and the vacuum-tank, and is provided with the cock $f$. The pipe K joins the pipe I, with the connecting-pipe between the pump and the pressure-tank D, and is provided with the cock $r$. The pipe M connects the pipe I with the pressure-tank D, and is provided with the cock $g$. The pipe M is also connected with the bottom of the pump by a suitable pipe, which is provided with the valve $x$ and the cock $h$.

The short pipes $i$ $i$ $i$, attached to the pipe I, are made of hard metal, and are provided with a screw-thread cut inside or outside to receive the soft-metal tube of the transporting-vessels and hold them securely while being exhausted and during the operation of filling them with gas. Sectional views of this tube are shown in different forms, Figs. 2 and 5. The thread is marked L in those figures. Other forms of the same thing are shown in Figs. 3 and 6. Fig. 6 shows the tube provided with a shoulder or collar, and a nut with a female screw is slipped over the tube and is provided with a shoulder to rest upon the shoulder of the tube. Between these shoulders a suitable gasket may be placed to prevent leakage of air or gas when pressure is applied. When used in this form, the soft-metal tube of the portable vessel is placed against the end of the tube $i$, and the nut screwed upon it until firmly pressed against the collar of the tube. In Fig. 5 a thread is cut on the outside of the tube $i$, upon which is screwed the nut. This nut is screwed upon the soft-metal tube. The screw-thread upon each of the tubes with the nut in place is sufficient to seal the joint tightly. If the soft-metal tube is large enough, it may be screwed upon the outside of the tube $i$. These tubes $i$ are provided with the faucets P, to be opened and closed as circumstances may require.

The transporting-vessels, as shown in Figs. 4 and 5, I construct of tin or thin metal, and provide them with a top which may be sealed to the vessel by any of the known methods. To this top I have brazed or soldered a soft-metal tube, soft enough to be screwed into the tubes or pipes $i$ and remain secured thereto firmly. A lead tube will answer the purpose. This tube I have marked $m$ in the drawings.

The operation of the apparatus is as follows: When the portable vessels N N are duly filled with the article of food to be kept, they are secured to the tubes $i$ $i$, as before described. The operator then opens the cocks $a$, $b$, and $c$, and by working the pump exhausts the air from both of the tanks A and D, which enters the pump through the valve S and is expelled through the valve $t$ and cock $c$. The cocks $a$, $b$, and $c$ are then closed, leaving a vacuum in both tanks. The cocks $d$ and $e$ are then opened, allowing the gas to be drawn from the generator or receptacle E through the pipe H, valve $v$ into the pump, and through the valve $t$ and cock $e$ into the gas-pressure tank D. The operator may now work the pump and increase the pressure of gas in the tank D to any desired point. The valves $d$ and $e$ are then closed. There is now a supply of gas under pressure in the tank D and a vacuum in the tank A. The cocks $b$ and $f$ are then opened, exhausting the air from the vessels N N, which is drawn into the vacuum-tank A. If the vacuum is insufficient, it may be increased by closing the cock $b$, opening the cock $c$, and working the pump until the gage $c'$ indicates that the pressure is sufficient. The cocks $e$ and $f$ are then closed, and the cock $g$ in the pipe M opened carefully until the vessels N N are filled with the gas at the desired pressure. If the pressure is not sufficient, close the cock $g$ and open the cocks $r$ and $h$. By working the pump the gas is drawn from the pressure-tank through the valve X, and forced through the valve $t$ and pipe $k$ to the transporting-vessels. Then close the cocks $r$ and $h$. Compress the soft-metal tube and take the vessels off, as before described.

To work the apparatus without the tanks, I begin, as before, with the cocks all closed and open the cocks $f$ and $c$, working the pump to exhaust the air from the transporting-vessels N N. Then close the cocks $f$ and $c$ and open the cocks $d$ and $r$. By operating the pump the gases are drawn from the generator and forced direct through the pipe K to the vessels N. The cocks $d$ and $r$ should then be closed and the transporting-vessels sealed and taken off, as before described.

I am aware that the keeping of fruits, vegetables, &c., by surrounding them with a purifying-gas has been attempted; but so far as I know all efforts in this direction have aimed to expel the air from the food-containing vessels by allowing the gas entering the vessel to expel the air therefrom. In this way the air is not entirely expelled, but a large portion of it remains to mix with the gas, and at the same time much of the gas is wasted, escaping with the air.

My invention, therefore, has for its object the exhaustion of the food-vessels before the gas is allowed to enter, and the vacuum thus created draws the gas into the vessel, where it remains in contact with the fruit, unmixed with air to any material extent. When the fruit is of a character which requires a high pressure of gas in contact with it, I have provided means for increasing this pressure. Thus it will be seen that the vacuum may be formed in the vessels by other mechanical and equivalent means well known to persons skilled therein—such as the use of a condenser instead of a pump, for example. The vacuum-tank A might be supplied with steam until the air was forced out, and then by condensing the steam a vacuum would be formed, which might be used in the same way as the vacuum formed therein by the pump.

In the above specification and accompanying drawings I have described and illustrated one practical form of using my process.

The advantages of the above method are many. By exhausting the air from the food articles to be kept in sound condition I avoid any admixture of gas and air, which must obtain to a greater or less extent when the air is expelled by the entrance of the gas. I also dispense with the necessity of putting a cock in the receptacle for the food to allow the air to escape, and avoid all waste of the gas, some of which must escape with the air as it is expelled by the gas. The air also surrounding the article of food which causes decay is drawn from the pores and interstices of the food, and its place is supplied with a preserving and purifying gas, while the vacuum in the vessels assists in conducting the gas therein, which, with some articles of food, may be sufficient of itself to induce enough pressure to the gas surrounding the food.

Having described my invention, what I claim and desire to secure is—

1. In an apparatus for preserving fruits and vegetables, the vacuum-tank A and gas-pressure tank D, connected by the pipe G, in combination with the pump B, having the valves a and t, connected together by suitable tubes and provided with the cocks a, b, and c.

2. In an apparatus for preserving fruits and vegetables, the pump B, for inducing a vacuum, in combination with the vacuum-tank A, the pipes J and I, the latter being provided with the nozzles i, and having means for connecting and disconnecting the same with the packing-vessels.

3. In an apparatus for preserving fruits and vegetables, the gas-pressure tank D, vacuum-tank A, pump B, and generator E, with their connections, in combination with the pipes J, M, and I.

4. In an apparatus for preserving fruits and vegetables, the pump B, in combination with the vacuum-tank A, having suitable tubular connections, the pipe I, provided with the nozzles i, the pipe J, and the cocks b and f.

LOUIS McMURRAY.

Witnesses:
BERNARD A. ROGGE,
THOS. KELL BRADFORD.